(12) United States Patent
DeLair et al.

(10) Patent No.: US 7,703,601 B2
(45) Date of Patent: Apr. 27, 2010

(54) HYBRID MESH BELT

(75) Inventors: Jeffrey E. DeLair, Leesport, PA (US); Joseph G. Szymborski, Sinking Springs, PA (US)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/980,881

(22) Filed: Oct. 31, 2007

(65) Prior Publication Data

US 2009/0111632 A1  Apr. 30, 2009

(51) Int. Cl.
B65G 15/54 (2006.01)

(52) U.S. Cl. ...................... 198/848; 198/850

(58) Field of Classification Search .............. 198/817, 198/844.1, 848, 849, 850–853
See application file for complete search history.

(56) References Cited

U.S. PATENT DOCUMENTS

| | | | |
|---|---|---|---|
| 2,114,237 A | 4/1938 | Pink | |
| 2,649,954 A | 8/1953 | Nawman | |
| 3,920,117 A * | 11/1975 | Roinestad | 198/853 |
| 3,978,976 A | 9/1976 | Kamp | |
| 4,186,566 A * | 2/1980 | AuYoung | 198/848 |
| 4,635,788 A * | 1/1987 | McDonald | 198/848 |
| 5,003,731 A | 4/1991 | Durr | |
| 6,070,715 A * | 6/2000 | Etherington et al. | 198/848 |
| 6,868,959 B2 * | 3/2005 | Thomas et al. | 198/817 |

FOREIGN PATENT DOCUMENTS

| | | |
|---|---|---|
| EP | 0370306 A1 | 5/1990 |
| GB | 20928 A.D. 1909 | 1/1910 |
| JP | 2-221006 * | 4/1990 |
| JP | H2-221006 | 9/1990 |

* cited by examiner

*Primary Examiner*—James R Bidwell
(74) *Attorney, Agent, or Firm*—Hodgson Russ LLP (57) ABSTRACT

A hybrid mesh belt having a mesh portion with side edges attached to modular plastic chains. The chains are provided with cavities on the bottom side. The cavities are suitable for engaging with driving sprockets that engage with the chains.

16 Claims, 8 Drawing Sheets

HYBRID MESH BELT

FIELD OF THE INVENTION

This invention relates generally to conveying belts, and specifically to mesh belts.

BACKGROUND OF THE INVENTION

Mesh belts made from woven plastic fibers are widely used for wet transport in the vegetable industry and particularly for salads. The mesh belts are typically provided with sealed belt edges. Coated drums are usually used to drive these belts. One significant problem in the application of such belts is the tracking on the driving and idling drums. This problem is particularly relevant in the case of short belts, but long belts also suffer from tracking problems. As a result of these problems, the belt edges may be damaged and may require process interruptions and expensive maintenance work. Also, belts with these type of drives need to be longitudinally tensioned to allow driving by drums. Since mesh fabrics are geometrically not totally homogeneous over the width of the belt, equal tensioning over the full belt width can be difficult to achieve.

Accordingly, there is a need for a mesh belt that offers a positive belt drive without any tracking problems thereby avoiding damage to the belt and increasing production efficiency and belt life.

SUMMARY OF THE INVENTION

The present invention meets the above described need by providing a mesh belt with the belt edges fixed to modular plastic chains. The fixing of the mesh belt to the chains at the belt edges can be achieved in various ways. The chains at the belt edge are provided with cavities on the bottom side. The cavities are suitable for engagement with driving sprockets.

The belt sections are formed into an endless belt by linking the ends of adjacent chain modules by means of pivot rods. The mesh sections between the chains may overlap loosely at the ends or may be joined by various techniques such as ultrasonics, mechanical clips, or the like.

The belt is driven by engagement of sprockets with the chains at the edge. The same type of sprockets may be used at the idling shaft as well. In order to stabilize the mesh portion, the midportion of the belt may be supported by drums or rollers with a suitable diameter, which is adjusted to the pitch diameter of the sprockets.

The belt of the present invention does not have to be placed under high tension because the sprockets provide positive drive without slippage. The sprockets also provide tracking for the belt. Commonly one sprocket per shaft is fixed, and the other sprockets on the same shaft remain loose in order to allow them to follow the belt when it expands or retracts under varying temperatures and load conditions. In other cases where the mesh fabric is unstable, it may be of advantage to fix both sprockets on the shaft, thus keeping the mesh belt transversally straightened.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
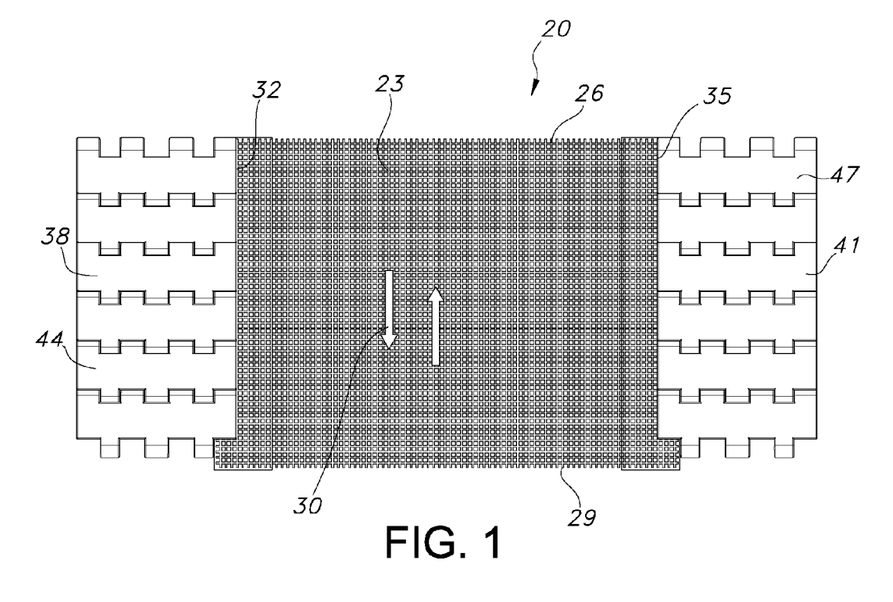
FIG. 1 is a top plan view of the hybrid mesh belt of the present invention.
Figure 2:
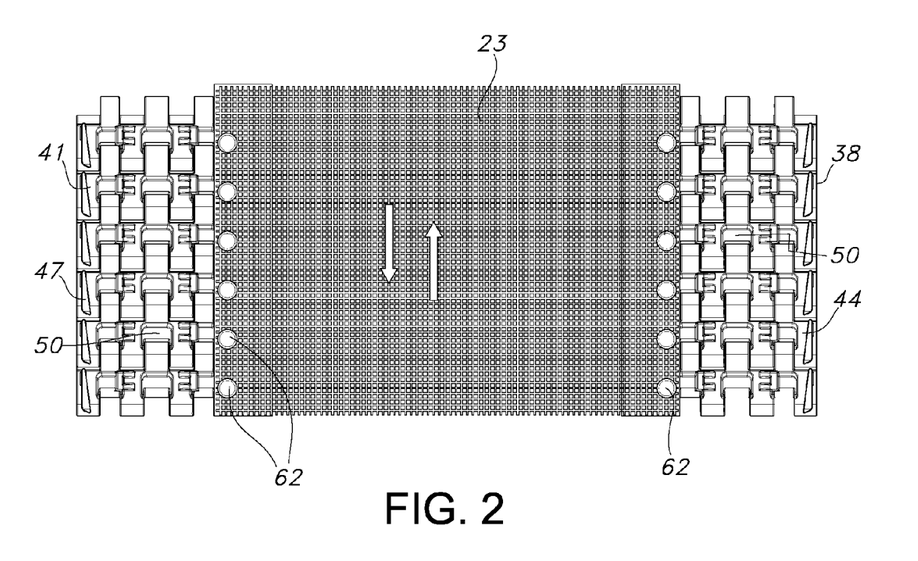
FIG. 2 is a bottom plan view of the belt shown in FIG. 1.
Figure 3:
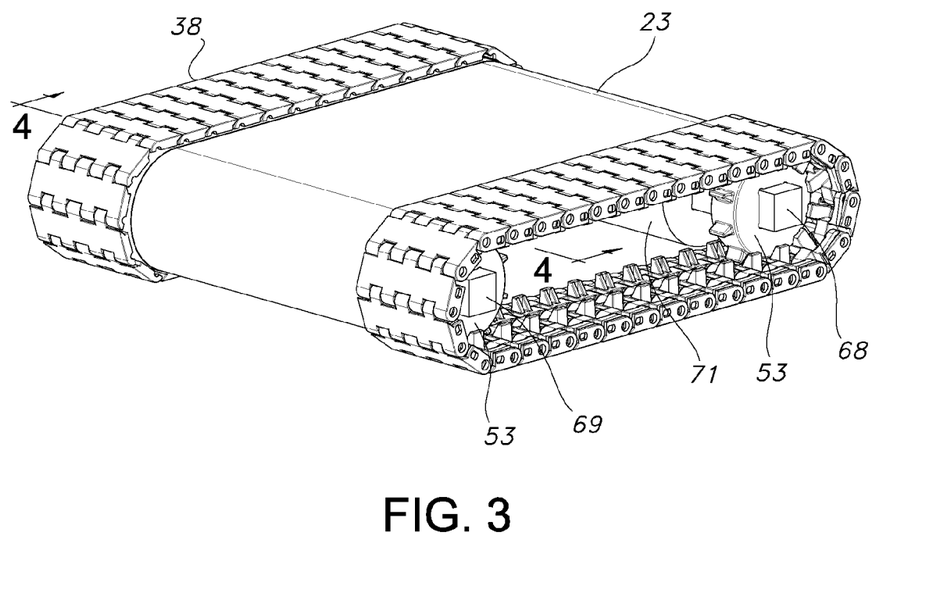
FIG. 3 is a perspective view of the hybrid mesh belt of the present invention installed in an endless loop with a pair of sprockets and a drum.
Figure 4:
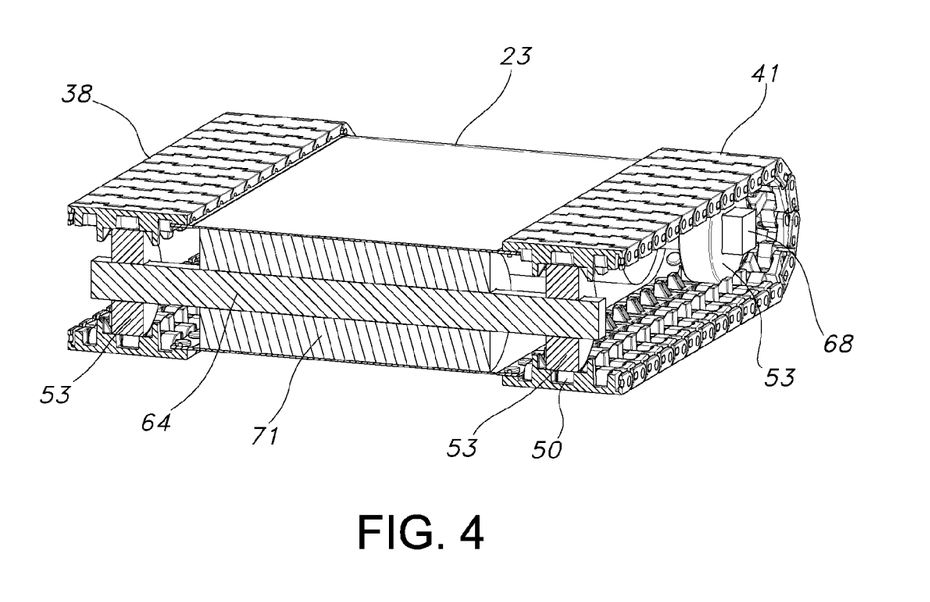
FIG. 4 is a cross-sectional view taken along lines 4-4 of FIG. 3.

Referring to FIGS. 1-8 generally and initially to FIG. 1, a hybrid mesh belt 20 according to the present invention is formed with a mesh portion 23. The mesh portion 23 may be formed from woven plastic fibers as will be evident to those of ordinary skill in the art based on this disclosure. The mesh construction is useful for drainage during the wet transport of items such as vegetables. The specific resins used to form the fiber strands, the diameter and weight of the fiber strands, and the weave pattern forming the mesh may be varied depending on many factors. The mesh portion 23 has a leading edge 26 and a trailing edge 29 with respect to a direction of belt travel indicated by arrows 30. The mesh portion 23 is attached such that it forms side edges 32 and 35 disposed on the left and right sides with respect to the orientation of FIG. 1. A pair of chains 38, 41 border the side edges 32 and 35. The chains 38, 41 are plastic modular chains with individual chain modules 44, 47 having link ends 45, 46 (FIGS. 7A and 7B) connected in rows by means of pivot rods 48 (FIG. 5C). Turning to FIG. 2, the chains 38, 41 are provided with cavities 50 that are suitable for engaging with drive sprockets 53 (FIGS. 3 and 4).

Figure 7A:
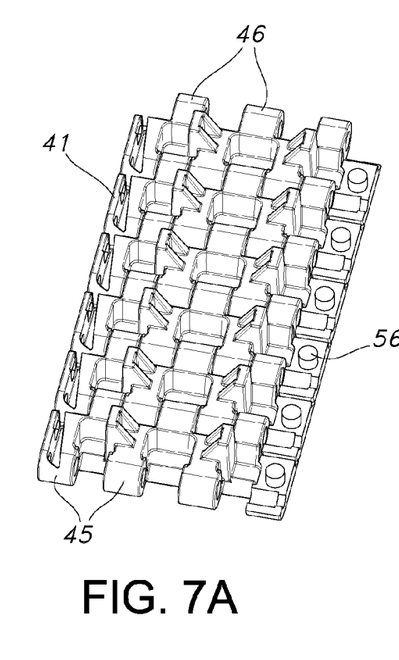
FIG. 7A is a perspective view of the chain shown on the left hand side of FIG. 2.
Figure 7B:
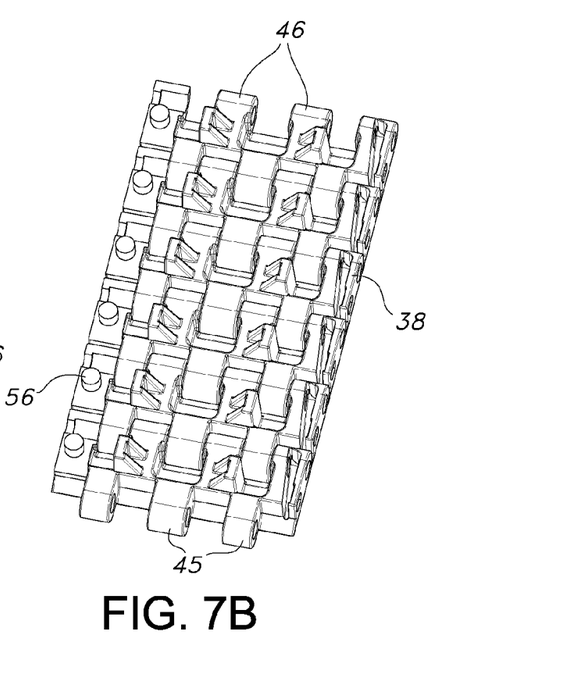
FIG. 7B is a perspective view of the chain shown on the right hand side of FIG. 2.

The fixing of the side edges 32 and 35 of the mesh portion 23 to the chains 38, 41 may be accomplished in various ways. For example, the chain modules 44, 47 may be provided with pre-molded studs 56 (FIGS. 7A and 7B).

Figure 6:
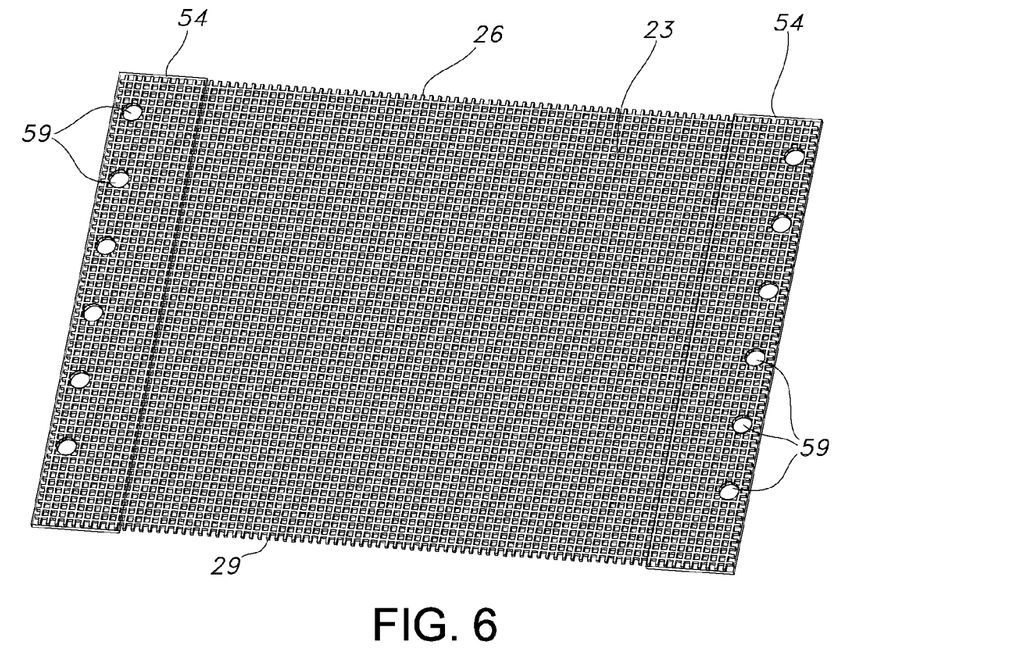
FIG. 6 is a perspective view of the mesh subassembly of the present invention.
Figure 8:
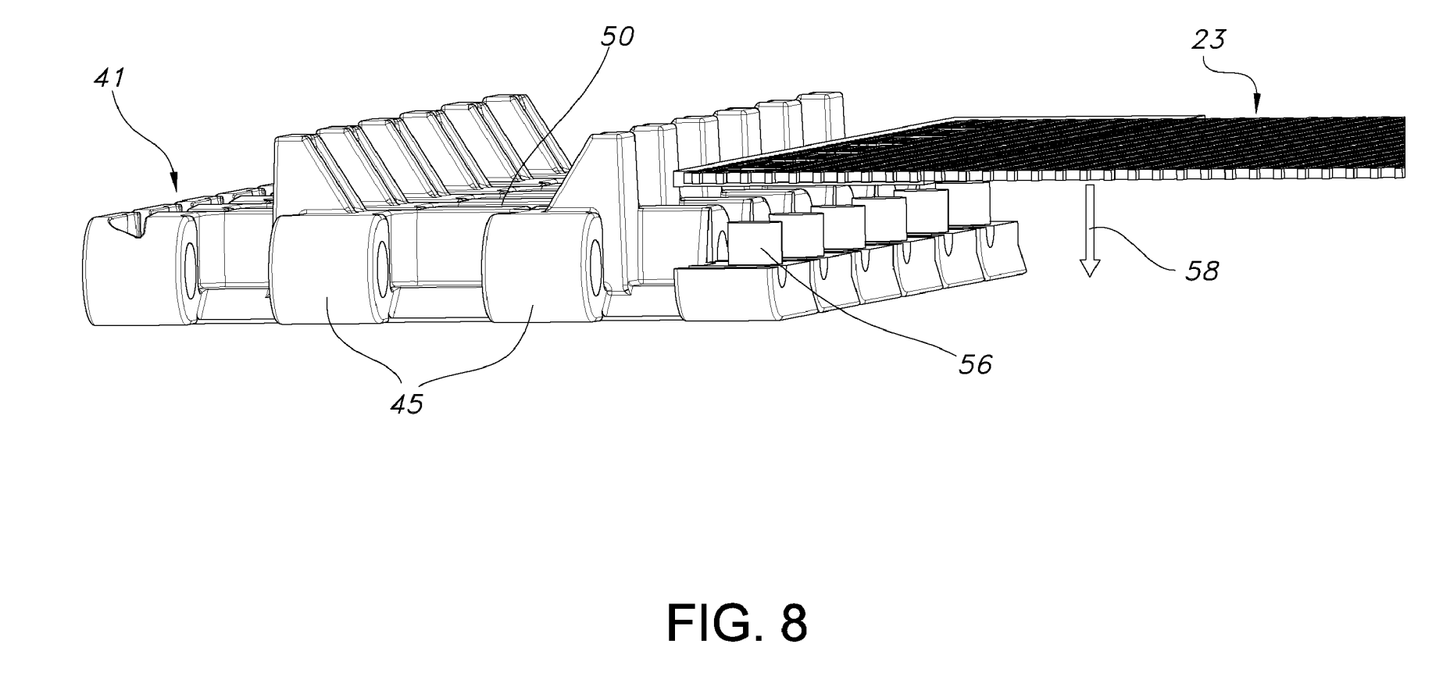
FIG. 8 is a perspective view showing one of the assembly steps for the present invention.
Figure 9:
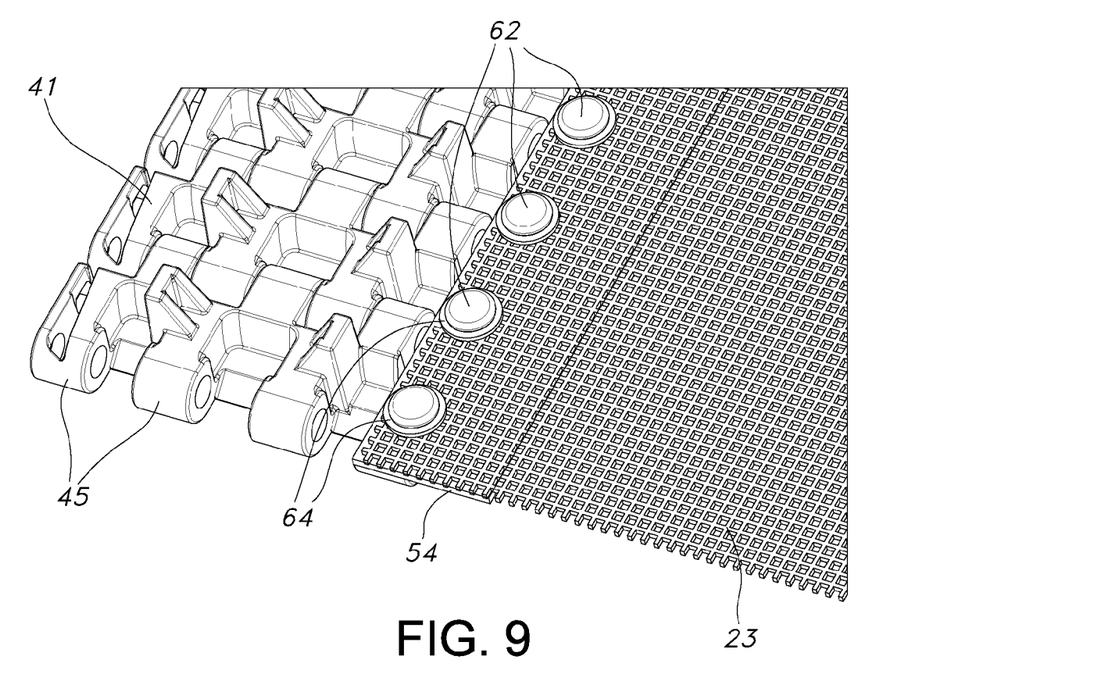
FIG. 9 is a perspective view showing a portion of the assembled belt.
Figure 10:
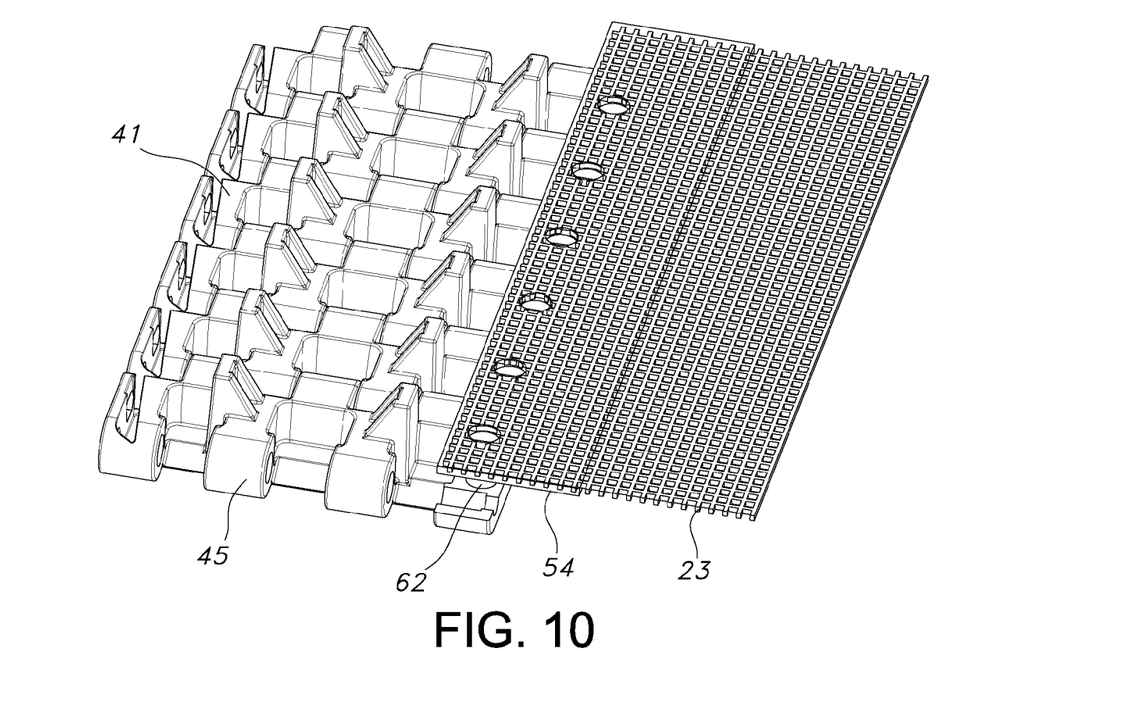
FIG. 10 is a perspective view of a portion of the belt.

Turning to FIG. 6, the mesh portion 23 is reinforced by an additional substrate 54 on one or both sides at the edges, and the mesh portion 23 has multiple openings 59 disposed therein. The openings 59 are disposed at predetermined positions near the side edges corresponding to the locations of the studs 56. As best shown in FIG. 8, in order to assemble the belt the studs 56 may be inserted through the openings 59 by placing the mesh portion 23 over the studs in the direction of arrow 58. Next, the studs 56 are fixed to the mesh portion 23 by thermoforming a mushroom-shaped head 62 (FIG. 2) at the end of the stud 56. As shown in FIG. 9, the attachment of the mesh portion 23 to the chain module may be strengthened by use of a washer 64.

Figure 5A:
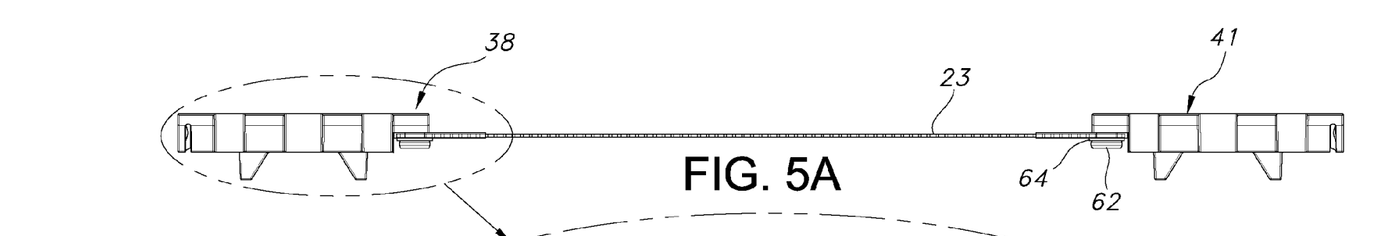
FIG. 5A is a front elevational view of the belt.
Figure 5B:
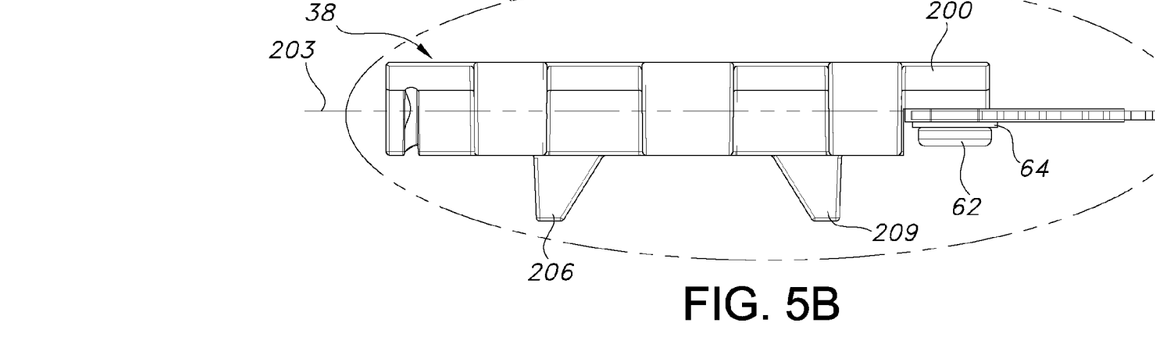
FIG. 5B is a detailed view of a portion of FIG. 5C.
Figure 5C:
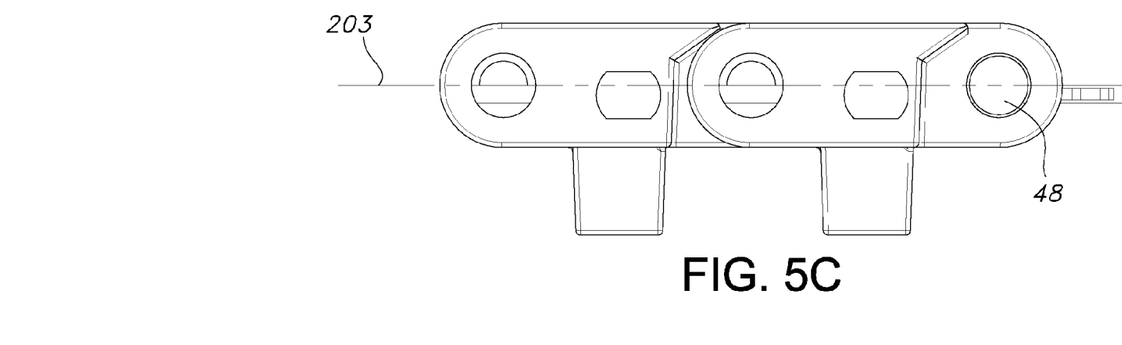
FIG. 5C is a side view of the belt.

In FIG. 5A, the mesh portion 23 is attached by means of a stud 56 with a mushroom-shaped head 62. The plane of the mesh portion 23 is substantially coplanar with the level of the pivot rod axis 203 for the pivot rods 48 that connect the chain modules to form the chains. The chain 38 also includes guide structures 206, 209 that extend downward with respect to the orientation of the figure. The guide structures 206, 209 surround the sprocket 53 when it is engaged with the cavities 50 in the chain (best shown in FIG. 4).

Returning to FIGS. 3 and 4, the belt 20 is made endless at the required length by linking the ends of the chain modules by means of the pivot rods 48. The mesh portion 23 between the chains 38, 41 may overlap loosely or may be joined by various techniques such as ultrasonics, mechanical clips, or the like as used for traditional conveyor belts.

The belt 20 is driven by sprockets 53. The sprockets 53 are coupled to an axle 68. The sprockets 53 engage with cavities 50 on the bottom of the chains 38, 41 to move the belt 20. The same type of sprockets 53 may be used at the idling shaft 69 as well. In order to stabilize the mesh portion 23, it may be advisable to support the mesh portion 23 with a drum 71 or rollers with a suitable diameter which is adjusted to the pitch diameter of the sprockets 53.

The belt 20 does not have to be placed under high tension because the sprockets 53 provide positive drive without slippage. At the same time, the sprockets 53 track the belt 20. Commonly one sprocket 53 per shaft is fixed whereas the other sprockets on the same shaft remain loose in order to allow them to follow the belt 20 when it expands or retracts under varying temperatures and loads. In other cases where the mesh fabric is unstable, it may be of advantage to fix both sprockets on the shaft, thus keeping the mesh belt transversally straightened.

Figure 11:
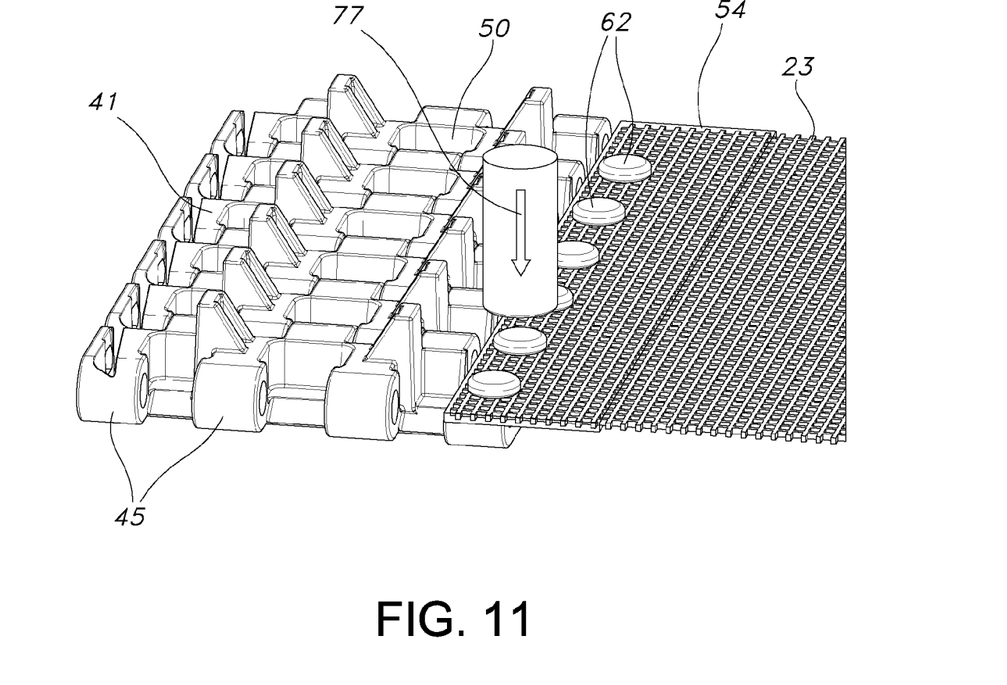
FIG. 11 is a perspective view illustrating one of the assembly steps for the present invention.
Figure 12:
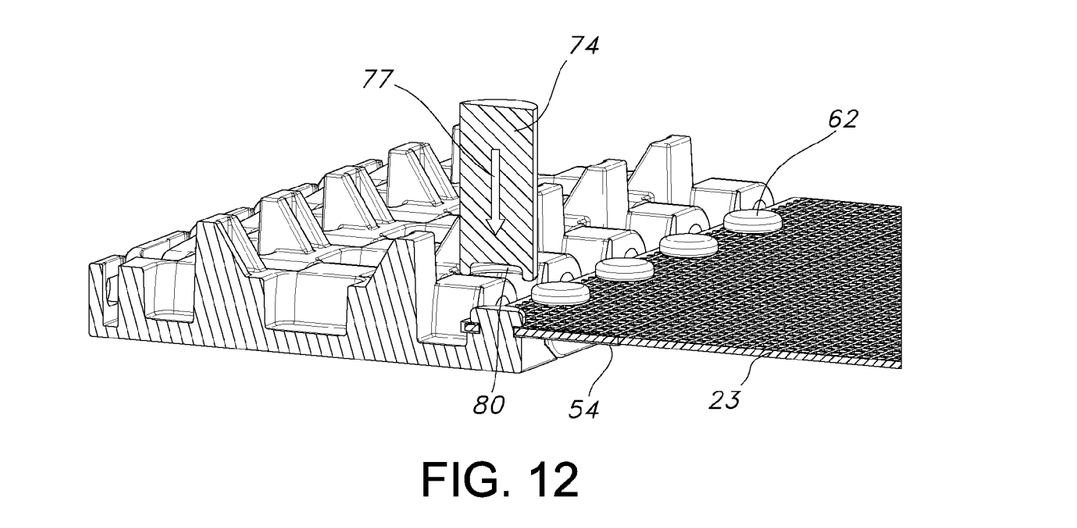
FIG. 12 is a cross-sectional view taken along lines 12-12 of FIG. 11.

In FIGS. 11 and 12, the attachment of the mesh portion 23 to the chain 38 is shown in greater detail. After the studs 56 are inserted through the openings 59 in the mesh portion 23, the top of the stud 56 may be thermoformed by a tool 74 into a mushroom-shaped head 62. The engagement of tool 74 with heat and pressure applied to the head of the stud 56 in the direction of arrow 77 fixedly attaches the mesh portion 23 to the chain 41. The tool 74 may be provided with a curved lower surface 80 that shapes the head of the stud 56. After application of the tool 74, the stud 56 has a mushroom-shaped head 62 that is wider then the opening 59 such that the stud 56 cannot be removed through the opening in the mesh portion 23.

Figure 13:
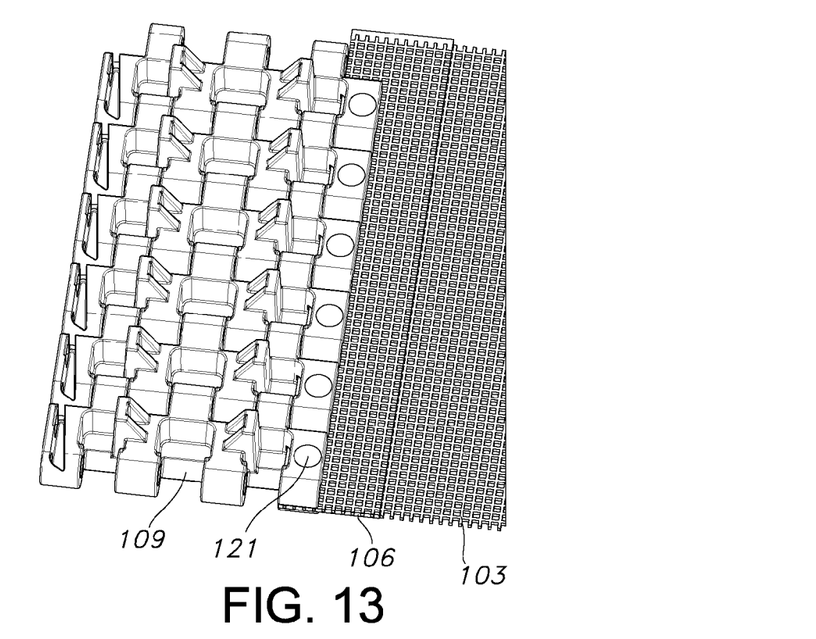
FIG. 13 is a perspective view of an alternate embodiment of the present invention.
Figure 14:
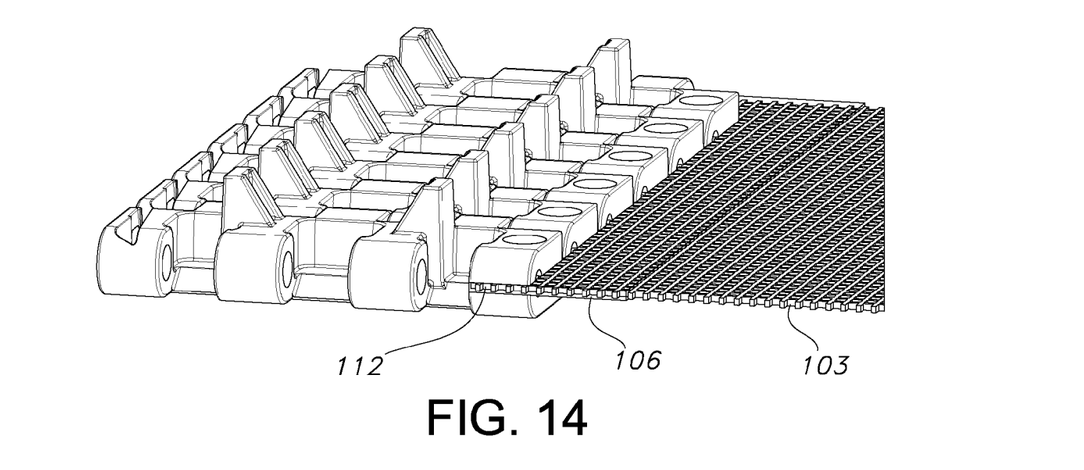
FIG. 14 is a perspective view of a portion of the belt shown in FIG. 13; and, FIG. 15 is a front elevational view of a portion of the belt shown in FIG. 13.
Figure 15:
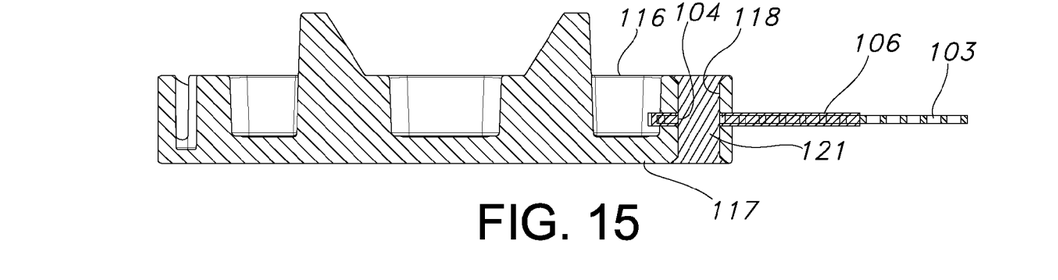

Turning to FIG. 13, an alternate embodiment of the belt is shown. The belt 100 also has a mesh portion 103 with openings 104 and a reinforcing substrate 106 disposed on one or both sides of the mesh portion 103. The inner edge of a chain 109 includes a slot 112 for receiving the edge 115 of the mesh portion 103. The chain 109 is also provided with a vertical opening 118 that extends from the top surface 116 of the chain 109 to the bottom surface 117 of the chain 109. The opening 118 intersects with the slot 112. The slot 112 is substantially parallel to the top surface 113 of the chain 109. As best shown in FIG. 15, the edge of the mesh portion 103 is inserted into the slot 112 until the opening 104 in the mesh portion 103 aligns with the opening 118 in the chain. A fastener such as a rivet 121 may be inserted through the aligned openings, and then the head of the rivet 121 may be upset to fixedly attach the mesh portion 103 to the chain. Other types of fasteners such as screws, bolts, or the like may also be suitable.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A hybrid mesh belt, comprising:
a mesh portion having a first side edge and a second side edge;
a first chain fixedly attached to the mesh portion at the first side edge;
a second chain fixedly attached to the mesh portion at the second side edge; and,
wherein the first chain further comprises a plurality of chain modules, the modules having a first plurality of link ends extending from an intermediate section in a first direction and a second plurality of link ends extending from the intermediate section in a second direction opposite the first direction, the link ends having transverse openings and the first and second link ends being offset such that the first link ends are capable of being intercalated with the second link ends of an adjacent module to provide aligned transverse openings for connecting rows of chain modules with pivot rods.

2. A hybrid mesh belt, comprising:
a mesh portion having a first side edge and a second side edge;
a first chain attached to the mesh portion at the first side edge;
a second chain attached to the mesh portion at the second side edge; and, wherein the mesh portion is sealed at the first and second edges by means of a substrate attached thereto.

3. A hybrid mesh belt, comprising:
a mesh portion having a first side edge and a second side edge;
a first chain fixedly attached to the mesh portion at the first side edge;
a second chain fixedly attached to the mesh portion at the second side edge;
a plurality of studs disposed on each chain;
wherein the mesh portion has openings defined therein, the openings sized to receive the studs and the openings disposed near the first and second side edges of the mesh portion.

4. A hybrid mesh belt, comprising:
a mesh portion having a first side edge and a second side edge;
a first chain attached to the mesh portion at the first side edge;
a plurality of studs disposed on each chain;
the mesh portion has openings defined therein, the openings sized to receive the studs and the openings disposed near the first and second side edges of the mesh portion; and, wherein the mesh portion is attached to at least one of the chains by inserting the studs through the openings and deforming a head portion of the studs to fixedly attach the mesh portion to the chain.

5. A hybrid mesh belt, comprising:
a mesh portion having a first side edge and a second side edge;
a first chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the first chain attached to the first edge of the mesh portion; and, a second chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the second chain attached to the second edge of the mesh portion.

6. A hybrid mesh belt, comprising:

a mesh portion having a first side edge and a second side edge;

a first chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the first chain attached to the first edge of the mesh portion; and, a second chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the second chain attached to the second edge of the mesh portion; and, wherein the mesh portion is sealed at the first and second edges by means of a substrate attached thereto.

7. The belt of claim 5, further comprising a plurality of studs disposed on each chain.

8. The belt of claim 7, wherein the mesh portion has openings defined therein, the openings sized to receive the studs and the openings disposed near the first and second side edges of the mesh portion.

9. A hybrid mesh belt, comprising:

a mesh portion having a first side edge and a second side edge;

a first chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the first chain attached to the first edge of the mesh portion;

a second chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the second chain attached to the second edge of the mesh portion;

a plurality of studs disposed on each chain;

the mesh portion has openings defined therein, the openings sized to receive the studs and the openings disposed near the first and second side edges of the mesh portion; and, wherein the mesh portion is attached to at least one of the chains by inserting the studs through the openings and deforming a head portion of the studs to fixedly attach the mesh portion to the chain.

10. The belt according to claim 5, wherein the mesh portion is fixed to the chains in a plane substantially coplanar with a plane of the pivot rod axis.

11. The belt according to claim 5, wherein the chain modules have an elongate slot along one side of the chain in a plane substantially parallel to the chain surface.

12. A hybrid mesh belt, comprising:

a mesh portion having a first side edge and a second side edge;

a first chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the first chain attached to the first edge of the mesh portion;

a second chain formed by a plurality of chain modules, the modules having a first plurality of link ends extending from an intermediate section in a first direction and having a second plurality of link ends extending from the intermediate section in a second direction opposite the first direction, the first and second link ends having transverse openings defined therein and being offset such that the first and second link ends of adjacent modules are capable of being intercalated to align the transverse openings such that adjacent modules can be pivotally connected by transverse pivot rods, the second chain attached to the second edge of the mesh portion;

the chain modules have an elongate slot along one side of the chain in a plane substantially parallel to the chain surface; and, wherein the chain has openings extending from a top surface of the chain to a bottom surface of the chain and intersecting with the slot along one side of the chain.

13. The belt of claim 12, wherein the mesh portion has openings sized to receive fasteners.

14. The belt of claim 13, wherein the mesh portion is attached to the chain by inserting the edge of the mesh portion into the slot until the opening in the mesh portion aligns with the opening in the chain and inserting a fastener through the aligned openings.

15. The belt of claim 14, wherein the fastener is a rivet.

16. A conveying system, comprising:

a hybrid mesh belt comprising, a mesh portion having a first side edge and a second side edge; a first chain attached to the mesh portion at the first side edge; and, a second chain attached to the mesh portion at the second side edge, at least one of the first and second chains having cavities formed therein, wherein the first chain further comprises a plurality of chain modules, the modules having a first plurality of link ends extending from an intermediate section in a first direction and a second plurality of link ends extending from the intermediate section in a second direction opposite the first direction, the link ends having transverse openings and the first and second link ends being offset such that the first link ends are capable of being intercalated with the second link ends of an adjacent module to provide aligned transverse openings for connecting rows of chain modules with pivot rods;

at least one sprocket having teeth sized to engage with the cavities formed in one of the first and second chains;

at least one axle supporting the at least one sprocket; and, at least one drum supporting the mesh portion as the chain traverses the sprocket.

* * * * *